J. W. MARTIN.
Wood-Pulp Machine.

No. 225,292.                Patented Mar. 9, 1880.

UNITED STATES PATENT OFFICE.

JAMES W. MARTIN, OF MISHAWAKA, INDIANA.

WOOD-PULP MACHINE.

SPECIFICATION forming part of Letters Patent No. 225,292, dated March 9, 1880.

Application filed June 11, 1879.

*To all whom it may concern:*

Be it known that I, JAMES W. MARTIN, of the town of Mishawaka, county of St. Joseph, and State of Indiana, have invented a new and useful Machine for Making or Grinding Wood-Pulp to be used for Making Paper, of which the following is a specification.

My new machine for making or grinding of wood-pulp to be used in making paper consists of a combination of circular saws, any suitable number of such saws being arranged upon one arbor, so as to form a cylinder, each saw being provided with teeth of square or dovetail form, having a concaved face, giving two points to each tooth, and the saw being so adjusted upon the arbor that each tooth will strike the wood or material to be ground and cut separate and independent of each other, and at the same time preventing the wood, which is fed upon the cylinder through a feed-box from above, being pressed down between the teeth of the saw so as to choke or clog the machine, the length of the fiber of the pulp being regulated by the gage or thickness of the saws forming the cylinder.

Figure 1:
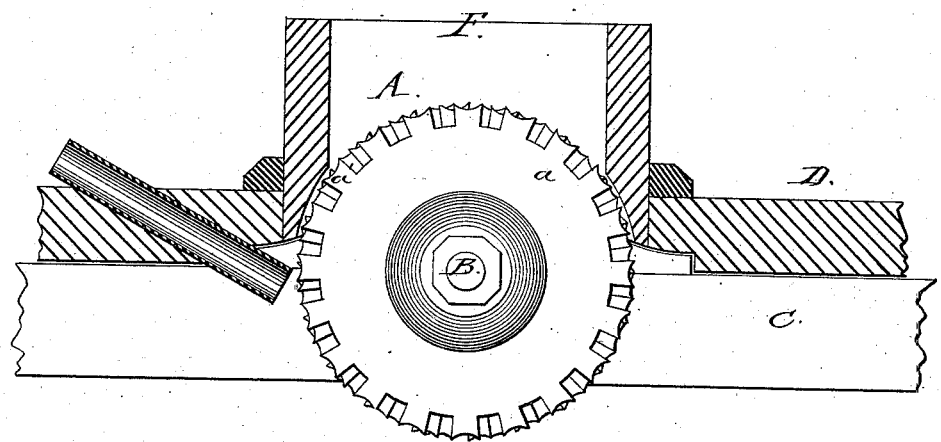
Figure 2:
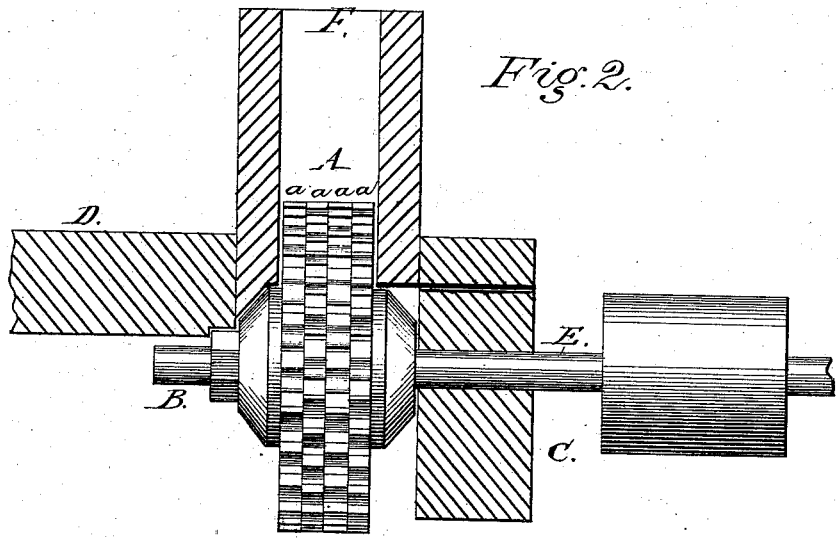

In my drawings, Figure 1 is a vertical central section through the box in which the wood is placed to be fed to the saws. Fig. 2 is a vertical central section cut in a plane at right angles to that of Fig. 1.

Similar reference-letters indicate like parts in both figures.

Referring to drawings, A is the cylinder, composed of several disks, *a a a a*, placed together and clamped by suitable nuts and washers which fit onto the mandrel B. C is a beam forming a part of the table D, in which is formed a suitable journal-bearing for the shaft E.

A hopper or box, F, is fixed in the top of table D to receive the wood from which the fiber is to be cut or torn. A pulley or gear wheel is secured to the shaft E to transmit motion from the applied power to rotate the gang of saws forming the cylinder A.

The saw-teeth $a'$, which, in profile view, present two exterior angles at their faces or edges, are concave or fluted, as shown, to give double biting-points to each. With this form of teeth I am enabled to rotate the saws in either direction with good effect.

A spout or tube is arranged obliquely in the table on either side of the cylinder of saws, to receive and discharge water to keep the teeth of the saws free from the cut fiber.

The saws in the cylinder or gang are so set on their mandrel that their teeth in their corresponding points are never opposite or in line with each other, so that each saw may cut independently of the others, to prevent clogging with long fiber.

Having thus described my invention, I claim as new and desire to secure by Letters Patent—

1. In a machine for preparing woody fiber for paper-pulp, the cylinder A, formed of a gang of saws provided with teeth of a rectangular or dovetail form, with their faces concave to form double cutting or biting points or angles, and arranged and clamped together so that none of their points will be opposite or in lines common to all, as and for the purpose set forth.

2. The saws *a*, having rectangular or dovetail teeth $a'$ with fluted faces, to give double biting or cutting points, as and for the purpose specified.

JAS. W. MARTIN.

Witnesses:
C. VALERY BINGHAM,
LORENZO W. MARTIN.